United States Patent [19]

Heisig

[11] 4,120,374
[45] Oct. 17, 1978

[54] SAFETY START SWITCH AND POWER TAKEOFF CONTROL VALVE ARRANGEMENT

[75] Inventor: Charles P. Heisig, Cudahy, Wis.

[73] Assignee: Allis-Chalmers Corporation, Milwaukee, Wis.

[21] Appl. No.: 793,606

[22] Filed: May 4, 1977

[51] Int. Cl.² ........................ B60J 23/00; B60K 28/00
[52] U.S. Cl. ................................. 180/53 R; 74/850; 192/0.094; 200/61.88
[58] Field of Search ............................ 180/82 A, 53 R; 192/0.049, 0.058, 0.094; 123/179 R, 179 K; 200/61.85, 61.86, 61.88, 82 R, 82 D, 82 C, 81 H; 74/850, 474

[56] References Cited

U.S. PATENT DOCUMENTS

| | | | |
|---|---|---|---|
| 2,997,996 | 8/1961 | Russey et al. | 74/850 |
| 3,209,872 | 10/1965 | Moyer | 180/53 R |
| 3,290,998 | 12/1966 | Clements | 137/554 X |
| 3,423,549 | 1/1969 | Sondej | 200/61.88 |
| 3,464,741 | 9/1969 | Falk | 200/82 D |
| 3,528,311 | 9/1970 | Fieber | 74/478 X |
| 3,613,482 | 10/1971 | Benson | 200/61.88 |
| 4,051,915 | 10/1977 | Behrens | 123/179 R |

Primary Examiner—Kenneth H. Betts
Attorney, Agent, or Firm—Arthur L. Nelson

[57] ABSTRACT

A safety device for a power takeoff shaft whereby the hydraulic control valve spool for controlling the power takeoff drive operates a switch in the engine starter circuit to disable the starter circuit when the power takeoff clutch is engaged.

10 Claims, 5 Drawing Figures

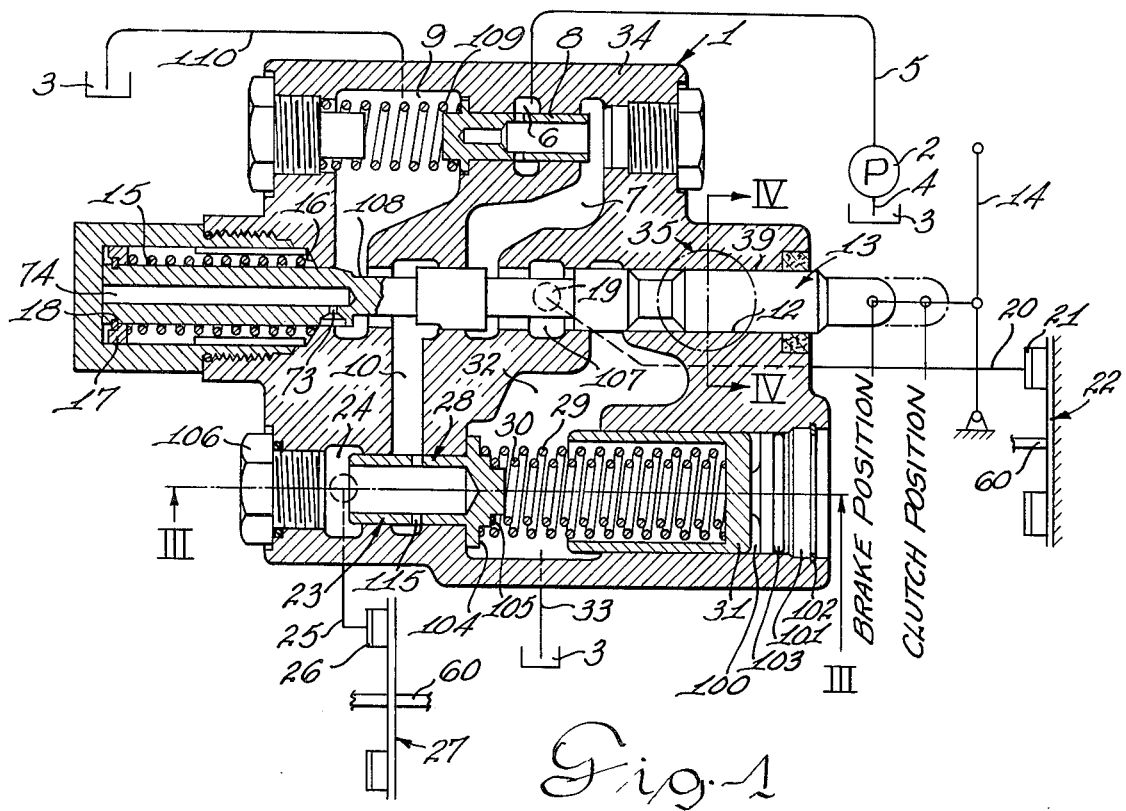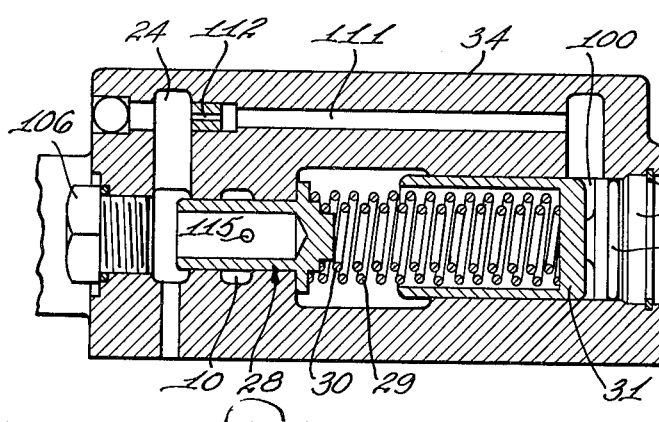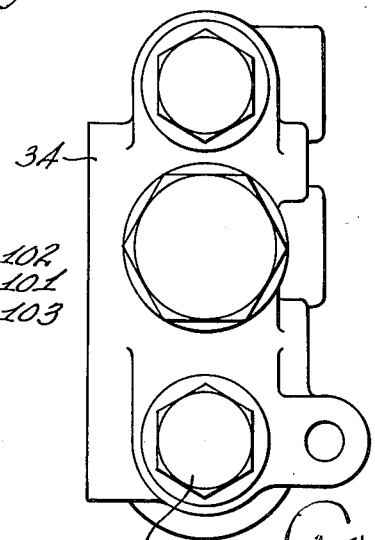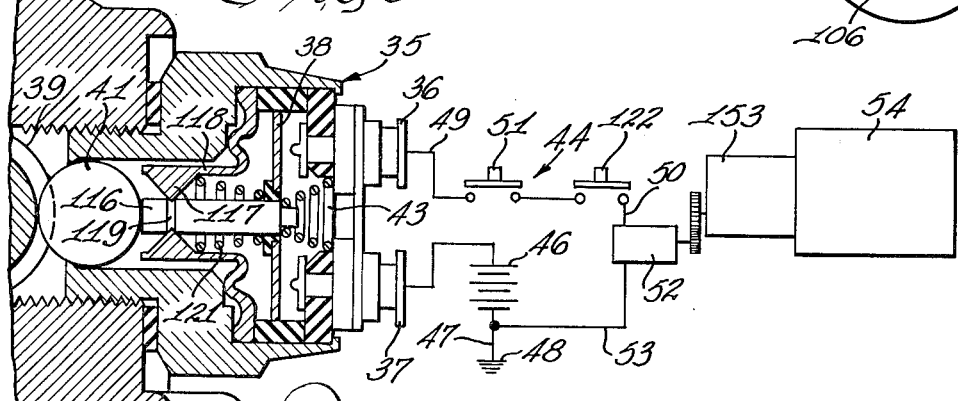

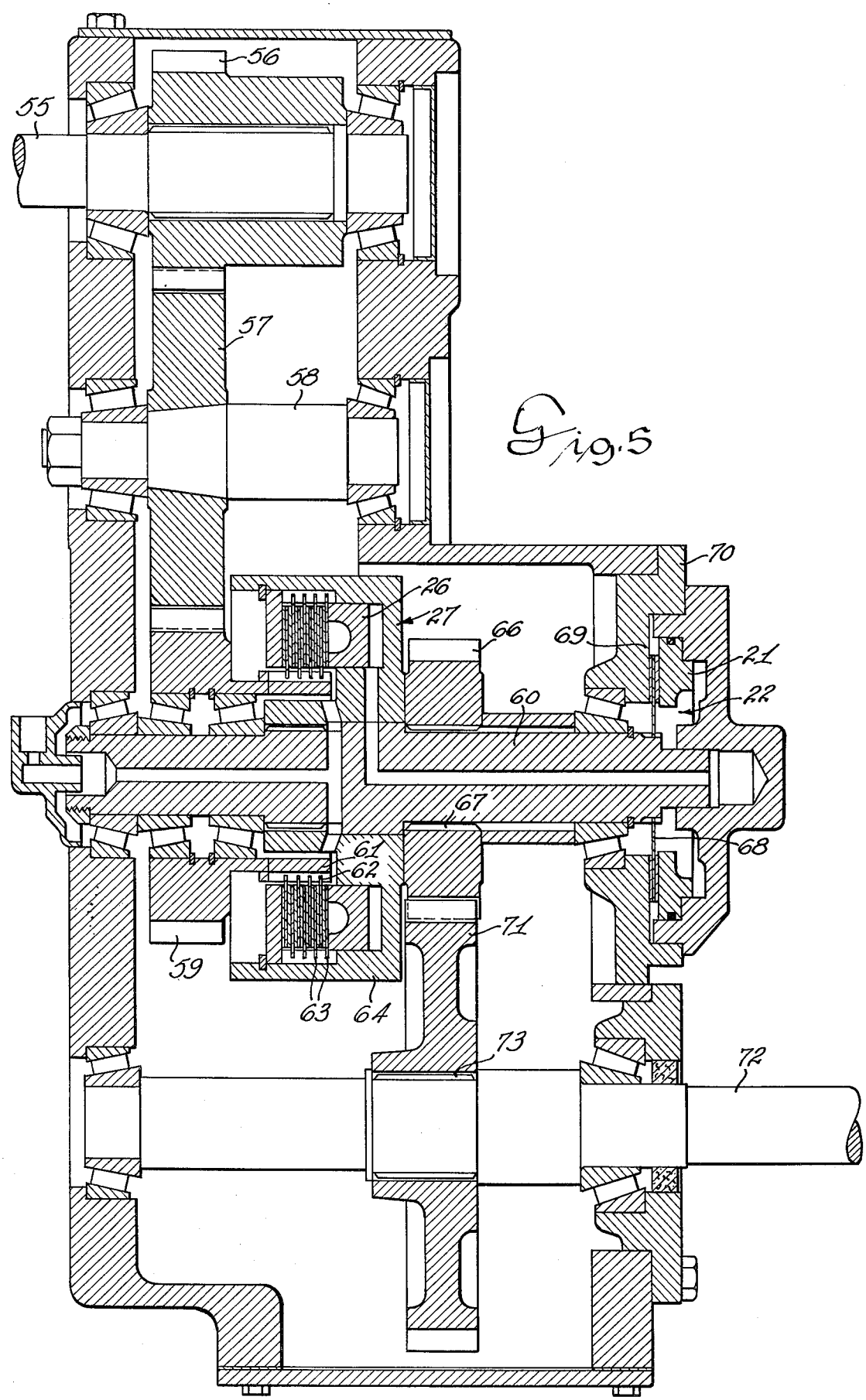

SAFETY START SWITCH AND POWER TAKEOFF CONTROL VALVE ARRANGEMENT

This invention relates to a safety device and more particularly to a start switch in the starter circuit for the engine on a tractor which disables the starting circuit when the hydraulic control valve is in the clutch engaging position for the power takeoff drive line.

The conventional tractor uses a power takeoff shaft to transmit power from the tractor to the implement to operate the implement. The operation of the shaft is controlled through a clutch whereby engaging of the clutch provides transmission of power through the shaft to drive the implement. When the shaft is not in operation, normally a brake is engaged to stop the rotation of the shaft. So long as the clutch is disengaged and the brake is engaged, the power takeoff shaft is not rotating, and there is not danger of clothing becoming entangled in the power takeoff shaft and causing injury to the operator. To avoid danger during starting of the engine on the tractor, some means to prevent rotation of the power takeoff shaft will provide a measure of safety for the operator. Accordingly, this invention provides a safety start switch in the starter circuit which disables the starter circuit when the spool of the control valve is in the clutch engaging position. When the spool valve of the power takeoff control valve is in the brake position, the engine of the vehicle can be started since the safety start switch is closed. Accordingly, this provides a safe operating condition for the tractor when the engine of the tractor is being started.

It is an object of this invention to provide a safety device for disabling the starter circuit of an engine when the power takeoff clutch is engaged.

It is another object of this invention to provide a safety start switch operated by the power takeoff control valve to open the safety start switch in the starter circuit to prevent starting of the engine when the power takeoff clutch is engaged.

It is a further object of this invention to provide a safety start switch in the starter circuit of a motor vehicle operated by the spool of a power takeoff control valve by engaging a plunger and thereby opening the switch in the starter circuit and prevent operation of the starter circuit when the power takeoff clutch is engaged.

The objects of this invention are accomplished by use of a safety start switch in the starter circuit operated by a spool of the power takeoff control valve. The safety start switch has a clutch engaging position in which the safety start switch is open and a brake engaging position in which the safety start switch is closed. Accordingly, the spool of the power takeoff control valve operates the switch to disable the starting circuit for starting the engine on the motor vehicle when the power takeoff clutch is engaged, and thereby avoid the danger of a live power takeoff shaft injuring the operator.

Referring to the drawings, a preferred embodiment of this invention is illustrated, in which:

FIG. 1 illustrates a cross-section view of the hydraulic control valve for the power takeoff clutch and brake;

FIG. 2 is an end view of FIG. 1 showing the hydraulic control valve for the power takeoff clutch and brake;

FIG. 3 is a cross-section view taken on line III—III of FIG. 1;

FIG. 4 is an enlarged cross-section view taken on line IV—IV of FIG. 1 and circuit diagram; and FIG. 5 is a cross-section view showing the main drive shaft and the power takeoff shaft and intermediate counter-shafts including a power takeoff clutch and a power takeoff brake.

Referring to FIG. 1, the hydraulic control valve 1 for the power takeoff clutch and brake is shown. The pump 2 receives hydraulic fluid from the sump 3 through the conduit 4. Hydraulic fluid is pressurized in the conduit 5 which is in communication with the passage 6 in the control valve 1. The chamber 7 is connected to the pressure limiting valve 8. The sump chamber 9 is connected through the passage 110 to sump 3. The chamber 7 is connected to the cylindrical central opening 12 which receives the spool 13. The spool 13 is operated by the lever 14. The spool 13 is biased in the left-hand direction by the spring 15 which operates between the flat surface 16 and the spring seat 17 seated on the snap ring 18 received in an annular groove of spool 13. The passage 19 is in communication with the central opening 12 and is in communication through the conduit 20 to the hydraulic actuator 21 of the brake 22. The chamber 10 is connected through the modulator valve 23 and clutch actuating passage 24 to conduit 25. Conduit 25 is connected to the hydraulic actuator 26 of the power takeoff clutch 27. The modulator valve 23 includes the sleeve 28 normally biased to the position shown in FIG. 1 by means of the springs 29 and 30. Springs 29 and 30 are positioned between the sleeve 28 of modulator valve and the accumulator piston 31. Sump chamber 32 is connected to sump 3 through a conduit 33.

An accumulator chamber 100 is formed in the lower part of the housing 34 with the plug 101 which is held in position by the snap ring 102. A seal 103 is positioned in an annular recess of the plug 101 which engages the housing 34 to seal the accumulator chamber 100.

The accumulator piston 31 reciprocates in the chamber 100 and the plunger in turn receives the springs 29 and 30 which engage radial surfaces 104 and 105 on the end of the sleeve 28. The sleeve 28 forms a part of the modulating valve 23. The radial ports 115 control the fluid flow from the clutch actuating chamber 10 to the passage 24. If the pressure in the clutch passage 10 rises more rapidly than a predetermined rate, it will cause the modulating valve 23 to close off communication between the clutch actuating chamber 10 and the passage 24. The cap 106 threadedly engages the end of the opening formed by the passage 24.

The housing 34 of the hydraulic control valve 1 for the power takeoff assembly carries a safety start switch 35. The safety start switch 35 includes the terminals 36 and 37 for connection through the contact 38 which is normally spring biased to an open position. Insulating means for mounting the terminals and contact are shown in FIG. 4. The land 39 on the spool 13 biases the ball 41, pin 116 and contact 38 in the brake engaging position to close the switch 35 to enable the starting circuit to operate. When the spool 13 of the hydraulic control valve 1 for the power takeoff is in the clutch engaging position, the spring 43 biases the switch to an open position and pin 116 to the detent position disabling the starting circuit for the vehicle. In the detent position, the ridges 117 of sleeve 118 rests in the groove 119 of pin 116. The switch snaps open and closed due to the springs 43 and 121 during movement of pin 116.

The starting circuit 44 is shown connected to the safety start switch 35. The battery 46 is connected through an electrical connector 47 to ground 48. The safety start switch 35 is also connected through the electrical connectors 49 and 50 and starter switch 51 and clutch safety switch 122 to the starter motor 52. Starter motor 52 is connected through the electrical connector 53 to ground 48. The starter 52 starts the engine 153 on the motor vehicle 54.

Referring to FIG. 5, the main drive shaft 55 drives through the gears 56 and 57 to the idler shaft 58. The gear 57 drives the gear 59. The gear 59 forms a hub 61 which carries clutch discs 62 which engage the clutch discs 63 mounted on the clutch drum 64. The hydraulic actuator 26 of the clutch 27 operates the clutch. The clutch drum 64 is connected to the gear 66 which is connected through a spline 67 to the power takeoff shaft 60. The brake disc 68 is connected to the power takeoff shaft 60 and the brake plate 69 on the housing 70 engages the brake disc 68 when the hydraulic actuator 21 in the brake 22 is actuated.

The gears 66 and 71 drive the power takeoff output shaft 72 through the spline connection 73. The power takeoff output shaft 72 is fitted with the conventional spline connection on the output end. The spline connection on the output of the power takeoff shaft may be for the conventional speeds of 540 r.p.m. or 1,000 r.p.m. output as desired.

The operation of this device will be described in the following paragraphs.

The main drive shaft 55 drives through the countershaft gearsets and the power takeoff shaft to the power takeoff output shaft 72. The drive train for the power takeoff assembly includes the clutch 27 and the brake 22. When power is transmitted through the power takeoff assembly the clutch 27 is engaged and the drive from the main shaft 55 drives through to the power takeoff shaft 72 to the implement. Normally the implement is connected under these conditions and shields are provided for safety precautions in the drive from the power takeoff assembly. When the power takeoff assembly is not in operation normally the brake 22 is engaged and clutch is disengaged and the output power takeoff shaft 72 is not rotating.

The control valve 1 is normally biased toward the left-hand position as shown in FIG. 1 which is also the brake position. The spring 15 biases the spool 13 toward the brake position as shown. Pressurized fluid from the pump 2 and chamber 6 is regulated by the pressure limiting valve 8 which operates against the springs 109 to limit the pressure in the chamber 7. Pressurized fluid flows through the passages 7 and 19 to actuate the brake 22.

When it is desired to engage the clutch and disengage the brake, the control lever 14 moves in a clockwise direction. This moves the spool 13 in the right-hand direction with the annular groove 107 opening passage 19 to sump chamber 32 which is connected through the sump conduit 33 to sump 3 to relieve the pressure in the brake actuator 21.

This relieves the pressure in the hydraulic actuator 21 of the brake 22 and also interrupts communication between the high pressure inlet passage 7 and the brake 22.

As the control lever 14 continues to move in a clockwise direction the spool 13 continues to move in the right-hand direction. The groove 108 permits flow from the high pressure chamber 7 to the clutch actuating chamber 10. The pressure increases in the clutch actuating chamber and if the opening between the high pressure chamber 7 and the clutch actuating chamber 10 is not too rapid, the pressure modulating valve 23 allows pressurized fluid to flow into the chamber 24. The modulating valve 23 closes in response to a sudden increase in pressure of pressurized fluid in chamber 10 biasing the sleeve 28 against the force of springs 29 and 30 and momentarily retards the pressure buildup in the hydraulic actuator 26 of clutch 27.

Pressure in passage 111 builds up as fluid flows through the orifice 112. Passage 111 leads to the accumulator chamber 100 and the pressurized fluid operates against the accumulator piston 31 which in turn operates against springs 29 and 30. Normally, the pressure buildup in the clutch actuator 26 is gradual and as the spool 13 moves in the right-hand direction, fluid travels through the groove 108 of spool 13 and is permitted to flow to the clutch actuator 26. The modulator valve 23 gradually increases the pressure applied to the clutch actuator 26 as the pressure builds up in the accumulator chamber 100. When the pressure buildup in the accumulator chamber completes its cycle the modulator valve 23 is open and the pressure of the fluid from the chamber 7 is applied to the hydraulic actuator 26 and the clutch is fully engaged.

When the engine is stopped and the pump 2 is no longer driven, the pressure decays in the chamber 7 and also in the port 73 and the axial passage 74 allowing the spring 15 to return spool 13 to its normal brake position as shown in FIG. 1 allowing the spool 13 to close switch 35.

When the spool 13 is moved to the clutch position, the spring 43 biases the contact 38 away from the terminals 36 and 37 opening the switch in the starter circuit 44. In this position, the starter circuit 44 is disabled and it is not possible to complete the starter circuit for the starter 52.

When, however, the spool 13 is in the position as shown in FIG. 1 and the brake 22 is actuated, the ball 41 is biased in the right-hand position as shown and contact 38 is biased to an engaging position with terminals 36 and 37. When the safety start switch 35 is closed, the starter circuit 44 is conditioned for starting the engine 153 if the starter switch 51 and clutch safety switch 122 are closed. With the hydraulic brake circuit actuated, pressurized fluid flows from the pump 2 through conduit 5, passages 6, 7 and 19 to the hydraulic actuator 21 when the engine is running and the pump is operating. Accordingly, when the vehicle engine is started, the pressurized fluid from the pump 2 engages the brake 22 and the power takeoff output shaft 72 is stationary. This normally provides a safety feature so that the operator is working under safe conditions when the vehicle is being operated and the engine is running.

The embodiments of the invention in which an exclusive property or privilege is claimed are defined as follows:

1. A safety device for use on a motor vehicle comprising, a starting circuit including, a safety start switch in said starting circuit for disabling said starting circuit when said safety start switch is open, a plunger for operating said safety start switch, resilient means normally biasing said safety switch to an open position, a drive shaft, a power takeoff drive line including a power takeoff shaft, a hydraulic clutch coupling said drive shaft with said power takeoff shaft through said drive line, a hydraulic circuit including a control valve for controlling operation of said hydraulic clutch, insulating mounting means supporting said safety start switch on said control valve, a longitudinally movable valve spool in said control valve defining a clutch engaging position for selectively engaging said clutch and a clutch disengaging position for disengaging said clutch, means on said valve spool engaging said plunger of said safety start switch for permitting opening said safety start switch when said valve spool is in the clutch engaging position and closing said safety start switch when said valve spool is in the clutch disengaging position.

2. A safety device for use on a motor vehicle as set forth in claim 1 including a brake in said hydraulic circuit for braking said power takeoff shaft when said valve spool is in the clutch disengaging position.

3. A safety device for use on a motor vehicle as set forth in claim 1 wherein said valve spool includes means normally biasing said safety start switch to a closed position, said resilient means including a spring normally biasing said safety start switch to an open position.

4. A safety device for use on a motor vehicle as set forth in claim 1 wherein said control valve includes a housing, a means supporting said safety start switch on said housing, a contact, insulating means supporting said contact on said plunger in said housing engaging said valve spool for closing said safety start switch when said spool is in the clutch disengaging position.

5. A safety device for use on a motor vehicle as set forth in claim 1 wherein said control valve includes a housing supporting said safety start switch, said plunger in said safety start switch engaging said valve spool, contacts connected through insulating means to said plunger normally closing said safety start switch when said control valve is in the clutch disengaging position.

6. A safety device for use on a motor vehicle as set forth in claim 1 including, a spring normally biasing said spool toward the clutch disengaging position.

7. A safety device for use on a motor vehicle as set forth in claim 1 including a brake in said hydraulic circuit for braking said power takeoff shaft, said control valve defining the clutch disengaging position coincidental with a brake engaging position and closing said safety start switch.

8. A safety device for use on a motor vehicle as set forth in claim 1 wherein said valve spool defines a spool, said resilient means including a spring normally biasing said spool to a brake engaging position coincidental with said clutch disengaging position and closing said safety start switch.

9. A safety device for use on a motor vehicle as set forth in claim 1 wherein said valve spool includes a spool defining a land, a groove adjacent said land, said land of said spool biasing said safety start switch to the closed position when said spool is in the clutch disengaging position.

10. A safety device for use on a motor vehicle as set forth in claim 1 including, manual means for biasing said valve spool to the clutch engaging position, resilient means normally biasing said spool toward a brake engaging and the clutch disengaging position, retaining means for normally retaining said valve spool in the clutch engaging position when said clutch is engaged.

* * * * *